Nov. 21, 1967  W. N. HADLEY ETAL  3,353,237
FABRIC SHEARING MACHINE HAVING WEB SMOOTHING MEANS
Filed July 29, 1965  4 Sheets-Sheet 1

INVENTORS
WILFRED N. HADLEY
WILLIAM J. HOLM
By Morse, Altman + Oates
ATTORNEYS

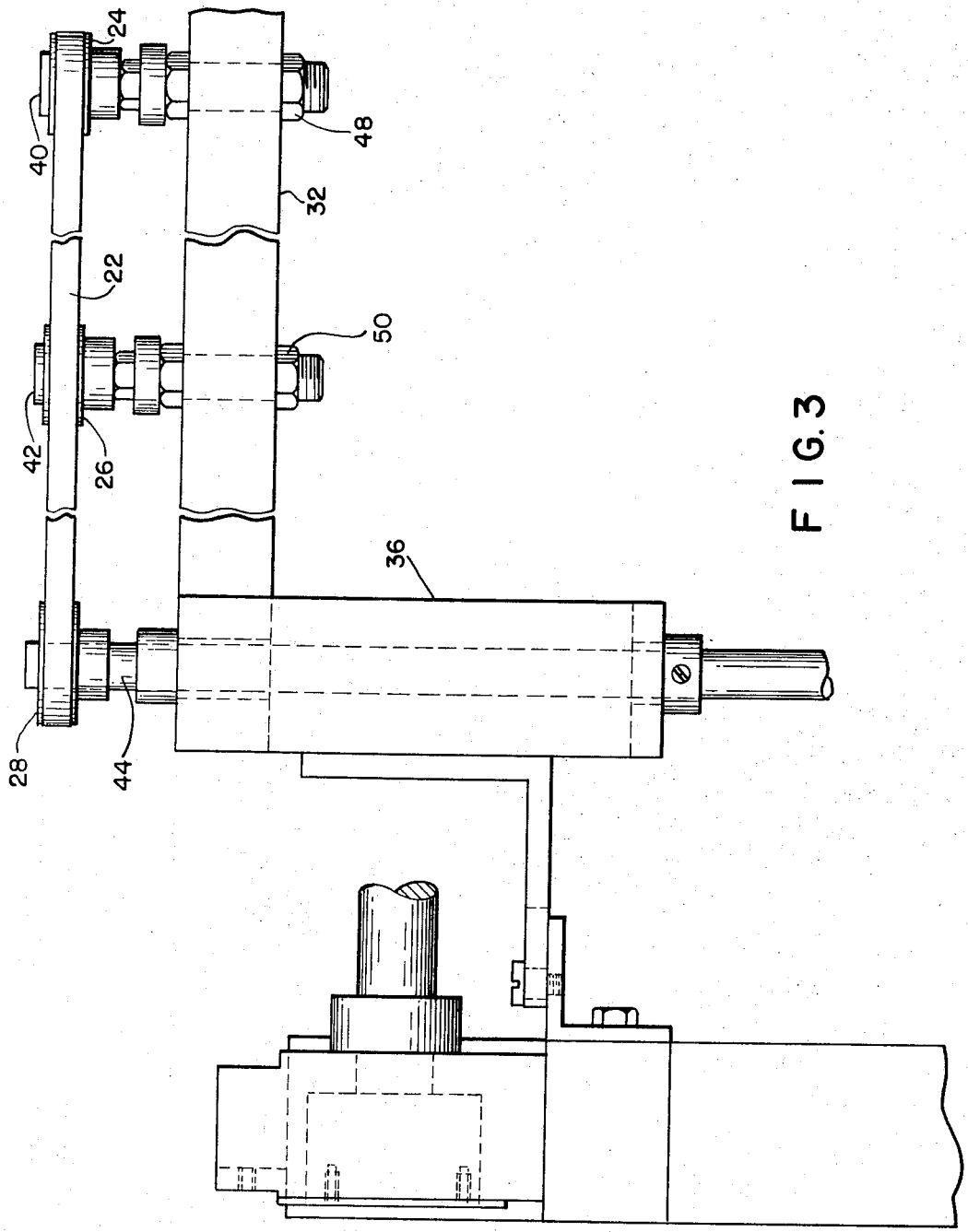

United States Patent Office 3,353,237
Patented Nov. 21, 1967

3,353,237
FABRIC SHEARING MACHINE HAVING
WEB SMOOTHING MEANS
Wilfred N. Hadley and William J. Holm, Springfield, Vt.,
assignors to Riggs & Lombard, Inc., Lowell, Mass., a
corporation of Massachusetts
Filed July 29, 1965, Ser. No. 475,713
6 Claims. (Cl. 26—15)

ABSTRACT OF THE DISCLOSURE

A pair of adjustable continuous belts are mounted on opposite sides of a moving web, the belts moving perpendicularly to the length of the web and outwardly from the center line thereof to flatten out any curls that may form in the selvedge prior to the entrance of the web into a cloth-shearing machine or the like.

---

Figure 1:
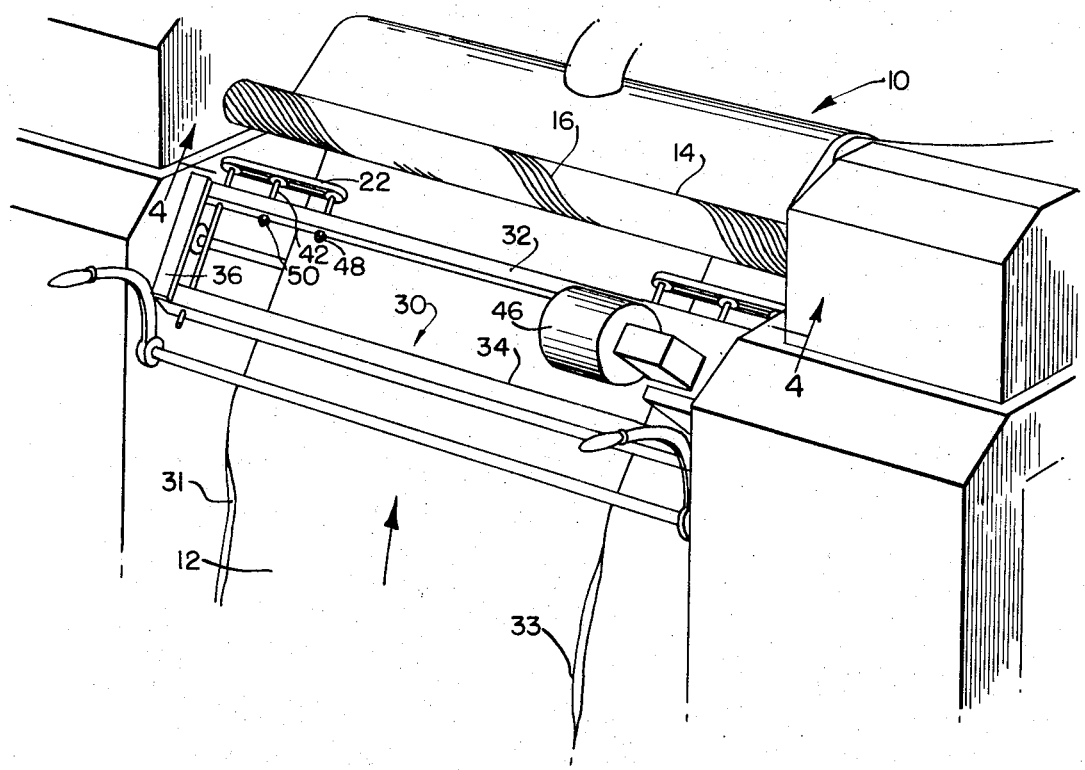

This invention relates generally to web control mechanisms and more particularly is directed toward a novel apparatus for maintaining a moving web in a flat, open condition throughout prior to the same being delivered to a shearing mechanism or the like. This invention also includes a novel apparatus for cross-brushing the full width of a moving cloth web for better presentation of the fibres to shearing blades or the like.

In the manufacture of certain web or sheet materials, particularly flimsy knitted or woven fabrics, the edges of the web display a tendency to curl over. When these edges roll over they create problems which are especially bothersome if the cloth has not passed through the shearing machine. Fabric shearing machines employ rotary cutters which co-act with fixed blades and a rest for the purpose of shearing protruding fibres on the surface of the cloth to a uniform height. The cutters, blade and rest define a relatively narrow gap and any variation in the thickness of the web will produce an irregular shearing action. Therefore, if the edges of the web are curled over as they enter the shearing mechanism these edges will be cut through or at least shorn irregularly so that the section of the cloth will be ruined.

Heretofore, it has been necessary to post one or two men in front of a fabric shearing machine for the purpose of uncurling and flattening the web edges prior to the web entering the shearing machine. This practice is not only dangerous for the attendants but inefficient since the web is moving at a relatively fast rate of speed and the attendants cannot always detect and manually uncurl the edges in time.

Accordingly, it is an object of the present invention to provide apparatus for automatically and continuously maintaining a moving web in a flat, open condition.

Another object of this invention is to provide a simple apparatus for automatically uncurling moving webs which apparatus is adjustable to web thickness and to angle of contact.

A further object of this invention is to provide a novel apparatus for laterally brushing the surface of a moving web across its entire width.

More particularly this invention features an apparatus for maintaining the edges of a moving web in a flat open condition, comprising a pair of endless belts, one disposed on each side of the web, and arranged laterally with respect to the length of the web. The belts are power-driven on rollers whereby a section of each belt is substantially in the plane of the web and in contact with the margins of the web. The web engaging portion of each belt is arranged to drive in a direction away from the center line of the web. The two belts provide a continuous outward brushing of the web margins effective to uncurl a rolled edge which may move under the belts. A flat rest or support is mounted on the back surface of the web to provide a working surface. The belts are mounted to be moved to or away from the web depending upon the thickness of the web and also the belts may be angularly inclined to provide a tapered contact with the web margins.

As a modification of this invention there is featured a pair of endless belts having brushing surfaces which extend from each side of the web, each having a length in excess of one half the width of the web so that they combine to span the full width of the web. The two belts are arranged in staggered relation one on either side of the web laterally thereof and adapted to brush outwardly to provide continuous cross-brushing of the web moving underneath.

Figure 4:
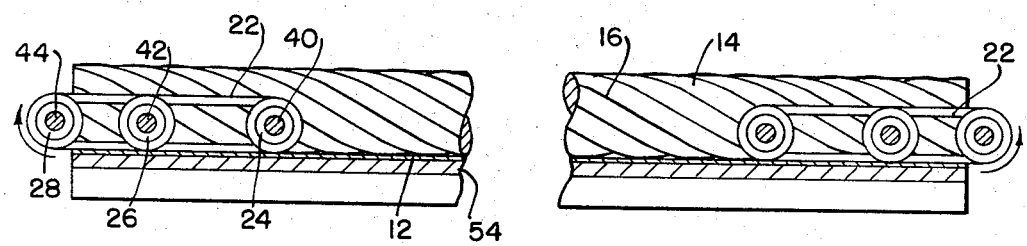
Figure 2:
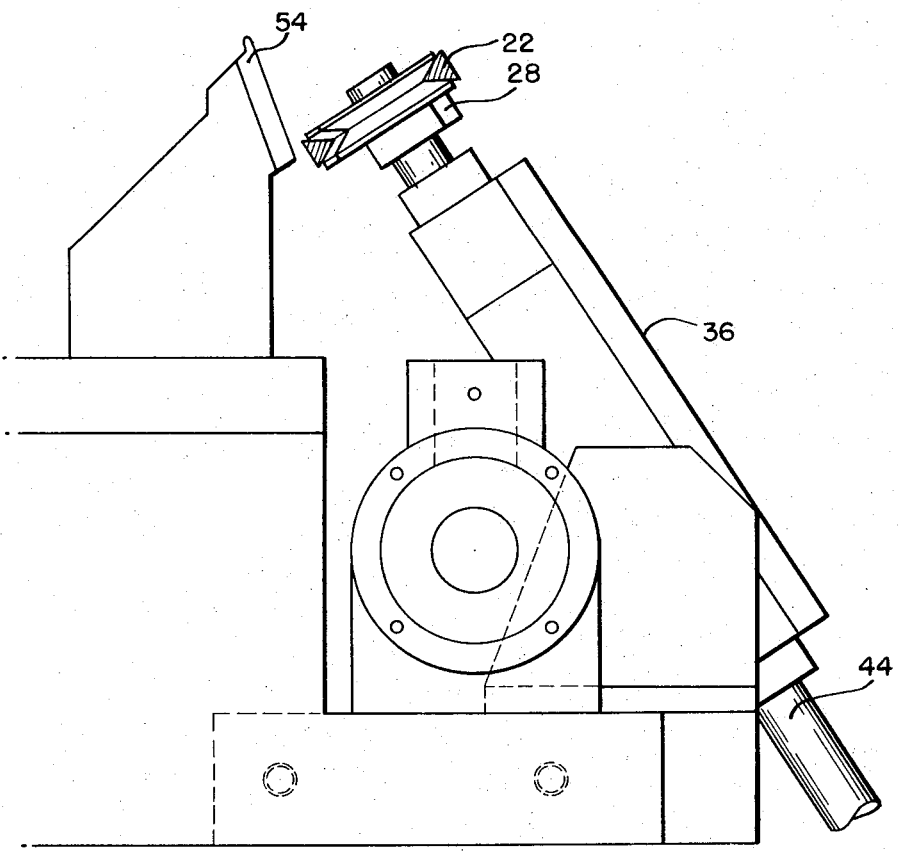
Figure 5:
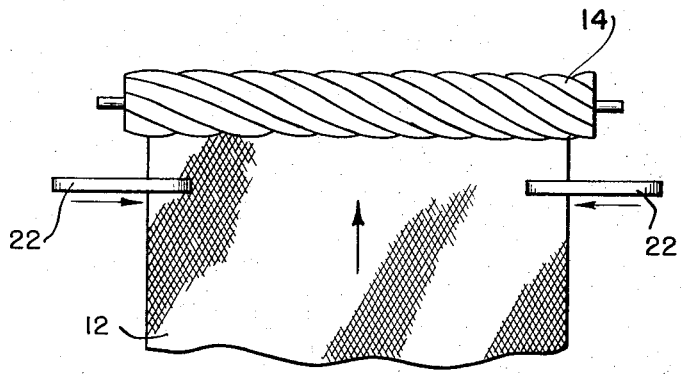
Figure 6:
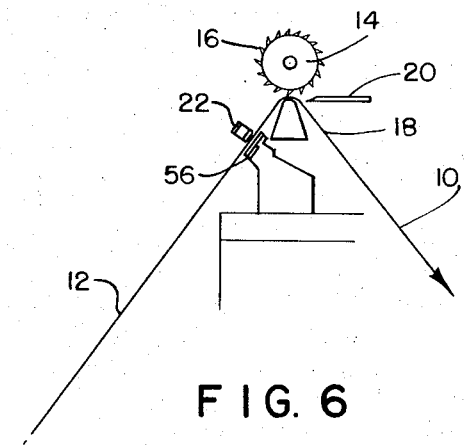
Figure 7:
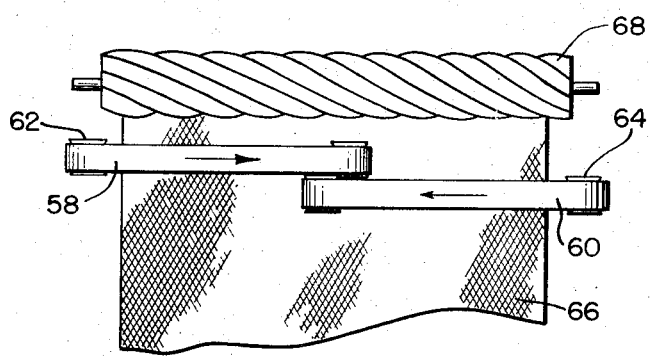

However, these and other features of the invention, along wtih further objects and advantages thereof, will become more fully apparent from the following detailed description of preferred embodiments of the invention, with reference being made to the accompanying drawings, in which:

FIG. 1 is a view in perspective of a cloth shearing machine with an edge control apparatus made according to the invention mounted thereon, FIG. 2 is a sectional side view thereof, FIG. 3 is a front elevation thereof, FIG. 4 is a cross-sectional view taken along the line 5—5 of FIG. 1, FIG. 5 is a somewhat schematic plan view of the invention, FIG. 6 is a schematic side elevation of the invention, and, FIG. 7 is a top plan view of a modification of the invention.

Referring now to the drawings, the reference character 10 generally indicates a shearing mechanism for shearing a moving web 12 of knit or woven material so that protruding fibres on the surface of the web are shorn to a uniform height. The shearing mechanism 10 typically comprises a power driven rotary shearing head 14 in the form of a cylindrical support for a plurality of helical cutting blades 16. As best shown in FIG. 6 the rotary shearing head 14 co-acts with a stationary rest 18 and a fixed ledger knife 20 to trim the upstanding fibres of the web 10 advancing over the rest 18. The shearing mechanisms now in use operate at high speeds and the clearance between the shearing components is quite restricted so that any irregularities in the thickness of the moving web will produce an uneven shearing pattern.

In shearing certain materials, such as flimsy knit or woven fabrics, the selvedges of the web tend to curl over so that the margins are of double thickness. When this condition takes place, it is necessary to correct it before the fabric enters the shearing mechanism. It will be understood that should the web pass against the shearing blades with the edges rolled over, the web would be shorn unevenly along the edges and may actually be cut through at these points. Material shorn in this fashion is, of course, of little or no commercial value.

The practice has been heretofore to station one or two men at the front of the shearing mechanism for the purpose of uncurling rolled edges prior to the same advancing into the shearing mechanism. Insofar as the web is moving at a fast rate, it is not always possible for the attendents to detect and correct all curled edges. In addition, this practice is dangerous insofar as the shearing head is quite sharp and is rotating rapidly.

According to the present invention this problem has been overcome by providing means for automatically unrolling curled edges of a moving web prior to the same being fed into a shearing mechanism or the like. As best shown in FIG. 1 this means includes a pair of belts 22 one on either side of the web 12 and adapted to bear on and brush laterally against the web 12 and towards the web edges away from the centerline. The belts are mounted on a series of pulleys 24, 26 and 28 carried by a frame 30 mounted to the shearing machine. The frame 30 comprises a pair of horizontal cross members 32 and 34 connected at their ends by end pieces 36 and 38 to define a rectangular frame. The pulleys 24, 26 and 28 are mounted on shafts 40, 42 and 44 which are disposed generally parallel to the length of the web 12 whereby the pulleys are mounted for rotation about axes generally parallel to the web length.

As best shown in FIG. 4 each belt 22 has its inner section substantially co-planar with the web and extending generally perpendicular to the length of the web. Each of the belts is power driven by means of a motor 46 in such a way that the section of the belts in contact with the web surface moves away from the center line of the web so as to provide an opposing lateral pulling of the web margins effective to uncurl a rolled selvedge (such as indicated at 31 and 33 in FIG. 1) passing thereunder.

The motor 46 is drivingly connected to the outermost pulleys 28 and the two sets of pulleys may be driven independently each with its own motor or with the single motor 46 may be arranged to drive both sets by means of a drive chain extending from one side of the frame to the other. In any event, both belts are power driven and apply a frictional lateral force on the web margins so as to unroll any curl developed along the edges of the web. It will be understood that the belts are located as close as practical to the shearing head 16 so that once the edges have been uncurled, there will be no opportunity for them to recurl after passing out from under the belts.

Insofar as it may be desirable to change the angle of contact of the belts with the web, or to raise or lower the belts, the shafts 40 and 42 are mounted to the frame member 32 through vertical slots 48 and 50 which permit the position of the pulleys to be altered within certain limits. For example, the belts may be adjusted to provide a taper contact with the web edges or to raise or lower the tangent contact to the cloth depending upon the cloth thickness.

In order to provide backing support for the web against the two belts, a backing plate 56, shown in FIGS. 2 and 6, is mounted to the shearing machine frame oppositely the pulleys 24, 26 and 28 extending the full width of the machine. Preferably, the plate 56 is provided with a smooth, polished surface in order to minimize frictional drag on the web moving thereover.

In practice, the belts 22 may be conventional V-belts or any other type of belt composed of flexible material providing a moderate frictional surface suitable for unrolling curled edges of the cloth.

The selvedge control mechanism while shown in use with a shearing machine may also be employed to good advantage with other textile machinery such as napping machines or the like where it is desirable to have the moving web in a flat open condition as it enters a particular machine.

Referring now more particularly to FIG. 7 there is shown a modification of the invention and in this embodiment a pair of belts 58 and 60 mounted on sets of pulleys 62 and 64 extend transversely over a moving web 66. The supporting frame and shafts for the pulleys have not been shown in FIG. 7 for sake of clarity but it will be understood that both belts 58 and 60 are power-driven in the same direction as the belts 22 of the principal embodiment. In other words, the inner sections of the belt which are co-planar with and bear against the surface of the web 66 drive laterally outwards of the web away from the web centerline.

The belts 58 and 60 are somewhat wider and longer than the belts in the principal embodiment and each extends over the centerline from opposite sides of the web in a staggered arrangement. In this manner the two belts will overlap the web at the center so that no portion of the web width is uncovered by the belts. In practice, the belts may be provided with bristles so as to actually brush the cloth surface across its entire width prior to the cloth entering the bite of a rotary shear 68, for example.

The cross-brushing effect provided by the belts 58 and 60 better presents the fibres or loops in the web to the shearing blades. The cross-brushing may be used in cooperation with regular cylindrical raising brushes to further enhance the resulting finishes. In practice, the speed of the belts and the texture of the brushing medium may be altered depending upon the fabric finish and desired results. This could apply to napped, pile, tufted or terry loop fabrics, for example.

The invention illustrated and described herein is relatively simple and may be provided as an attachment to existing shearing machines, napping machines and the like to provide an automatic and effective web control mechanism with substantially no alteration to the existing equipment present at this point. The modification provides a simple and effective means for controlling simultaneously the web edges and brushing the web across its full width for a better shearing or napping action.

While the invention has been described with particular reference to the illustrated embodiments numerous modifications will appear to those skilled in the art. Accordingly, the above description and accompanying drawings should be taken as illustrative of the invention and not in a limiting sense.

Having thus described the invention, what we claim and desire to obtain by Letters Patent of the United States is:

1. In combination with a fabric shearing machine adapted to shear to a uniform height fibers protruding from the surface of a moving open width fabric web, apparatus for uncurling the rolled edges of a moving fabric web prior to its entry into said machine, comprising
   (a) a pair of members providing endless surfaces,
   (b) means mounting said members to said machine at the fabric entrance thereof transversely of said web one over each edge thereof and with a section of each endless surface generally co-planar with one surface of said web,
   (c) power means for moving said endless surfaces in opposite directions whereby said sections will move laterally outwards over said edges to uncurl rolled web edges, and,
   (d) a backing plate mounted behind said web opposite said members.

2. Apparatus according to claim 1 including pivotal means supporting said members for movement to or away from said web.

3. Apparatus for uncurling the rolled edges of a moving web, comprising
   (a) a pair of endless belts,
   (b) means including a plurality of pulleys mounting said belts transversely of said web, one belt over each edge thereof and with a section of each belt generally co-planar with one surface of said web,
   (c) power means for moving said belts in opposite directions whereby said belt sections will move laterally outwards over said edges to uncurl rolled web edges,
   (d) at least some of said pulleys being independently movable to or away from said web for selectively varying the angle of contact between said belts and the web surface.

4. In combination with a fabric shearing machine adapted to shear fibers to a uniform height which protrude from the surface of a moving open width fabric web, apparatus for uncurling the rolled edges of a moving web prior to its entry into said machine, comprising
(a) a pair of endless belts,
(b) means mounting said belts to said machine at the fabric entrance thereof transversely of said web one over each edge thereof and with a section of each belt generally co-planar with one surface of said web,
(c) each of said belts being of sufficient length to extend from one edge of the web over the centerline thereof,
(d) power means for moving said belts in opposite directions whereby said belt sections will move laterally outwards over said web to brush the surface thereof.

5. Apparatus according to claim 4 wherein said belts are arranged in staggered relation across said web.

6. Apparatus according to claim 4 including mean supporting said mounting means for movement selec tively to or away from said web.

References Cited
UNITED STATES PATENTS

| | | | |
|---|---|---|---|
| 1,681,917 | 8/1928 | Horstmann | 26—1 |
| 2,878,602 | 3/1959 | Broad | 38—14 |
| 3,237,752 | 3/1966 | Roiland | 38—14 |
| 3,256,624 | 6/1966 | Miller et al. | 38—14 |

M. HENSON WOOD, JR., *Primary Examiner.*

ALLEN N. KNOWLES, *Examiner.*